(12) United States Patent
Harrison

(10) Patent No.: US 9,180,529 B1
(45) Date of Patent: Nov. 10, 2015

(54) DRILLING SYSTEM USING A POCKET HOLE JOINT METHOD

(71) Applicant: Christopher Harrison, Pittsburgh, PA (US)

(72) Inventor: Christopher Harrison, Pittsburgh, PA (US)

(*) Notice: Subject to any disclaimer, the term of this patent is extended or adjusted under 35 U.S.C. 154(b) by 322 days.

(21) Appl. No.: 13/874,663

(22) Filed: May 1, 2013

(51) Int. Cl.
*B23B 47/28* (2006.01)
*B23B 45/14* (2006.01)
*B23B 51/00* (2006.01)

(52) U.S. Cl.
CPC ............ *B23B 51/0054* (2013.01); *B23B 47/28* (2013.01); *B23B 2247/10* (2013.01)

(58) Field of Classification Search
CPC .... B23B 47/28; B23B 47/287; B23B 45/003; B23B 49/003; B23B 49/005; B23B 2247/10; Y10T 408/5653; Y10T 408/56245; Y10T 408/567
USPC ........................................ 408/112, 97, 115 R
See application file for complete search history.

(56) References Cited

U.S. PATENT DOCUMENTS

| | | | | | |
|---|---|---|---|---|---|
| 2,294,303 | A | * | 8/1942 | Jagow | 408/112 |
| 2,335,614 | A | * | 11/1943 | Spievak | 408/84 |
| 2,539,223 | A | * | 1/1951 | Bellek | 408/112 |
| 2,671,667 | A | * | 3/1954 | Flory | 279/18 |
| 2,792,726 | A | | 5/1957 | Vick | |
| 3,191,462 | A | * | 6/1965 | Plunske | 408/80 |
| 3,496,974 | A | * | 2/1970 | Silvey et al. | 144/365 |
| D264,930 | S | | 6/1982 | Lindsay | |
| 4,466,601 | A | * | 8/1984 | Raines | 269/79 |
| 4,802,798 | A | * | 2/1989 | Adamson | 408/112 |
| 4,969,781 | A | * | 11/1990 | Fahrner et al. | 408/79 |
| 5,129,292 | A | | 7/1992 | Albert | |
| 5,509,762 | A | | 4/1996 | Fredricksen | |
| 5,586,846 | A | * | 12/1996 | Johns | 408/72 R |
| 5,649,793 | A | | 7/1997 | Ericksen et al. | |
| 5,947,654 | A | * | 9/1999 | Blankenship et al. | 408/72 B |
| 6,250,186 | B1 | | 6/2001 | O'Berry | |
| 6,394,712 | B1 | * | 5/2002 | Weinstein et al. | 408/103 |
| 6,503,029 | B1 | * | 1/2003 | Ende et al. | 408/1 R |
| 6,637,988 | B1 | * | 10/2003 | Park | 408/103 |
| 7,597,513 | B2 | * | 10/2009 | Chiang | 408/115 R |
| 8,840,345 | B1 | * | 9/2014 | Park | 408/115 R |
| 2003/0123941 | A1 | * | 7/2003 | Emerson | 408/103 |
| 2007/0041799 | A1 | * | 2/2007 | Schaefer et al. | 408/97 |
| 2007/0071562 | A1 | * | 3/2007 | Spitznagel | 408/84 |
| 2007/0201961 | A1 | * | 8/2007 | Chiang | 408/115 R |
| 2008/0075546 | A1 | * | 3/2008 | Lin | 408/115 R |

FOREIGN PATENT DOCUMENTS

EP 346231 A1 * 12/1989 ............. B23B 31/22

* cited by examiner

*Primary Examiner* — Sunil K Singh
*Assistant Examiner* — Ryan Rufo

(57) ABSTRACT

A drilling system for joining pieces of wood using a pocket hole joint method features a first wood block having a planar first wood block mating surface and a second wood block having as planer second wood block mating surface and a second wood block drilling surface. A pocket having a cylindrical side wall and a planar front wall is angularly located on the second wood block drilling surface. The system features a drilling unit having a cylindrical outer sleeve and a cylindrical inner sleeve with a cylindrical shaft located in the inner sleeve. A drill bit is located on a shaft first end. A drill is activated to rotate the drill bit while a user applies force to the drill for pushing the drill bit through the second wood block into the first wood block.

2 Claims, 5 Drawing Sheets

DRILLING SYSTEM USING A POCKET HOLE JOINT METHOD

FIELD OF THE INVENTION

The present invention relates to drilling systems, or more specifically, drilling systems used to join wood components.

BACKGROUND OF THE INVENTION

There are many different types of joining methods used in woodworking including the pocket hole joint method. This joint method is effective; however, if the hole is drilled at the wrong angle the wood can become damaged when the screw is tightened. The present invention features a drilling system for joining pieces of wood using a pocket hole joint method Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a drilling system for joining pieces of wood using a pocket hole joint method. In some embodiments, the system comprises a first wood block having a planar first wood block mating surface and a second wood block having a planar second wood block mating surface and a second wood block drilling surface. In some embodiments, a pocket having a cylindrical site wall and a planar front wall angularly located on the second wood block drilling surface.

In some embodiments, the system comprises a drilling unit having a cylindrical outer sleeve and a cylindrical inner sleeve with a cylindrical shaft located in the inner sleeve. In some embodiments, a drill bit located on a shaft first end. In some embodiments, the drill bit is positioned just posterior to an aperture on the inner sleeve when in a first position. In some embodiments, the drill bit is positioned through the aperture when in a second position. In some embodiments, a drill is activated to rotate the drill bit while a user apples force to the drill for pushing the drill bit through the second wood block into the first wood block.

DESCRIPTION OF PREFERRED EMBODIMENTS

Figure 1:
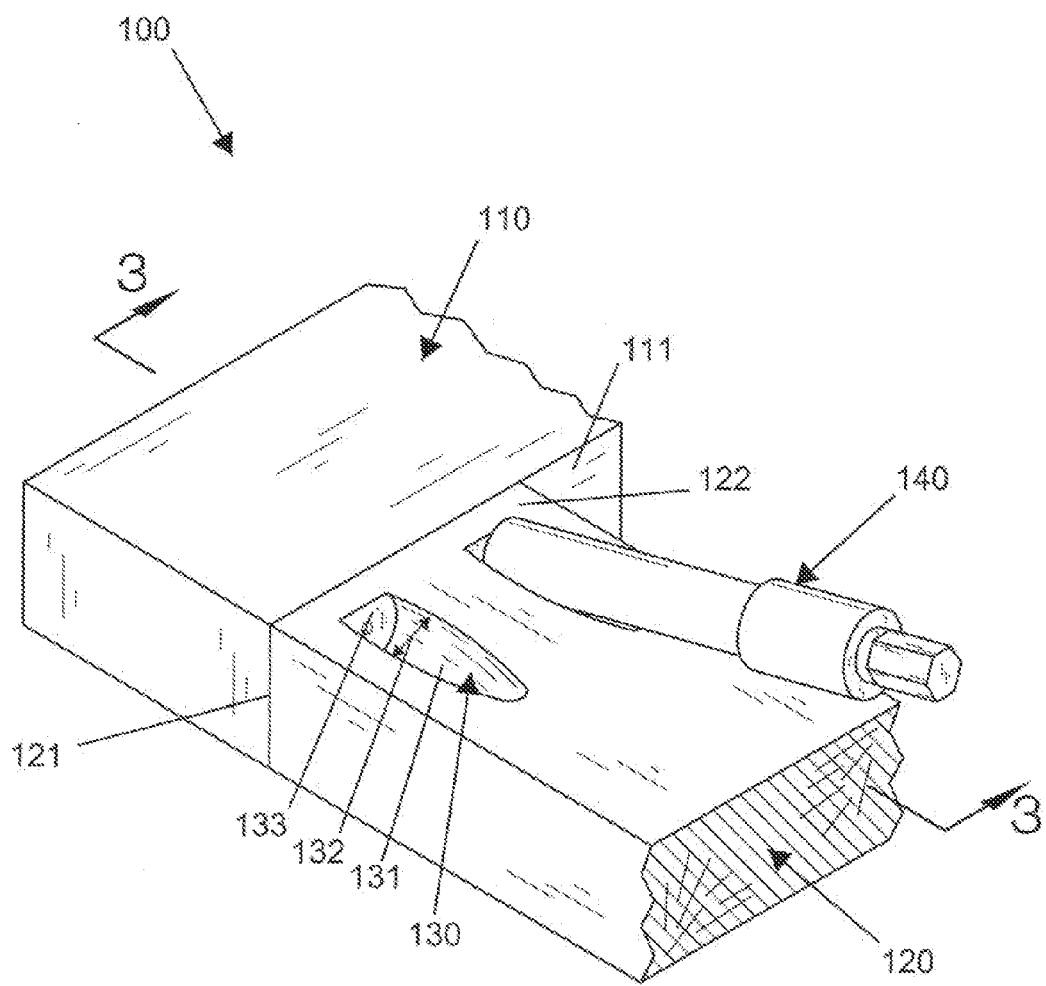
FIG. 1 shows a perspective view of the present invention.
Figure 2:
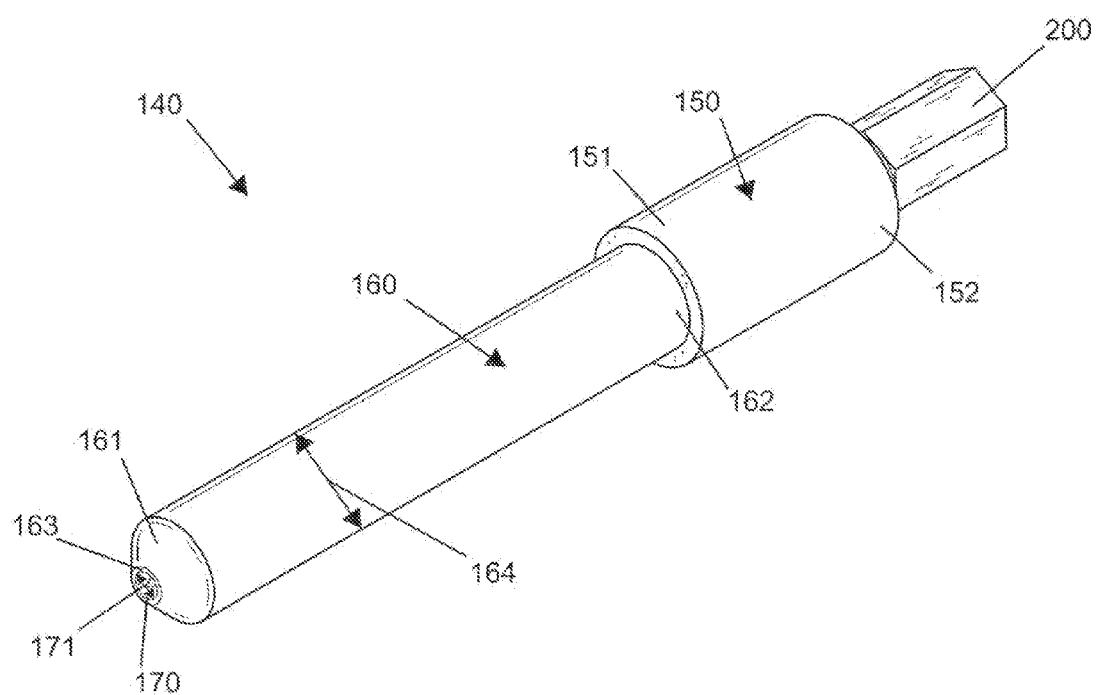
FIG. 2 shows a perspective view of the drilling unit of the present invention.
Figure 3:
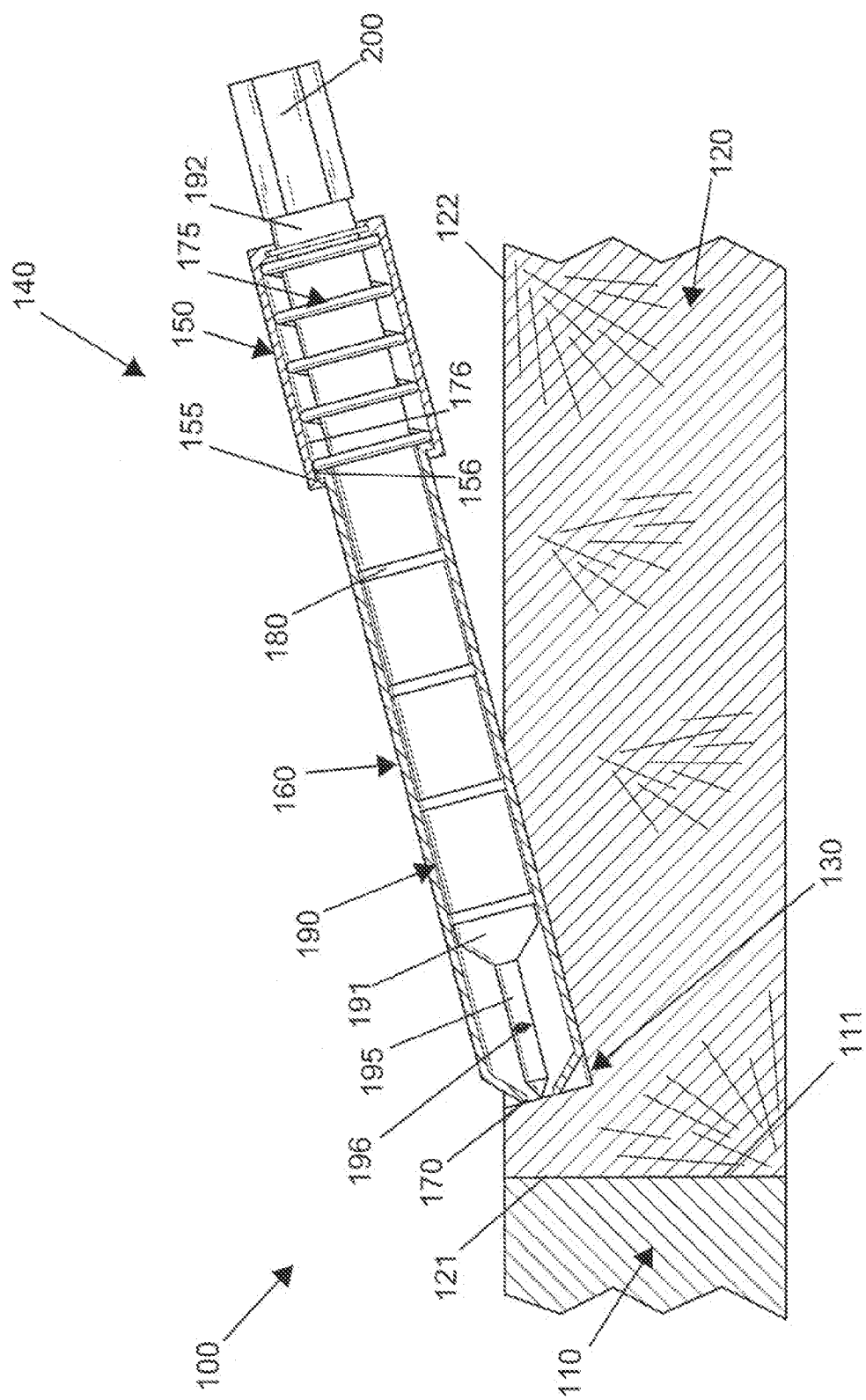
FIG. 3 shows a perspective view of the present invention in a first position before drilling a hole.
Figure 4:
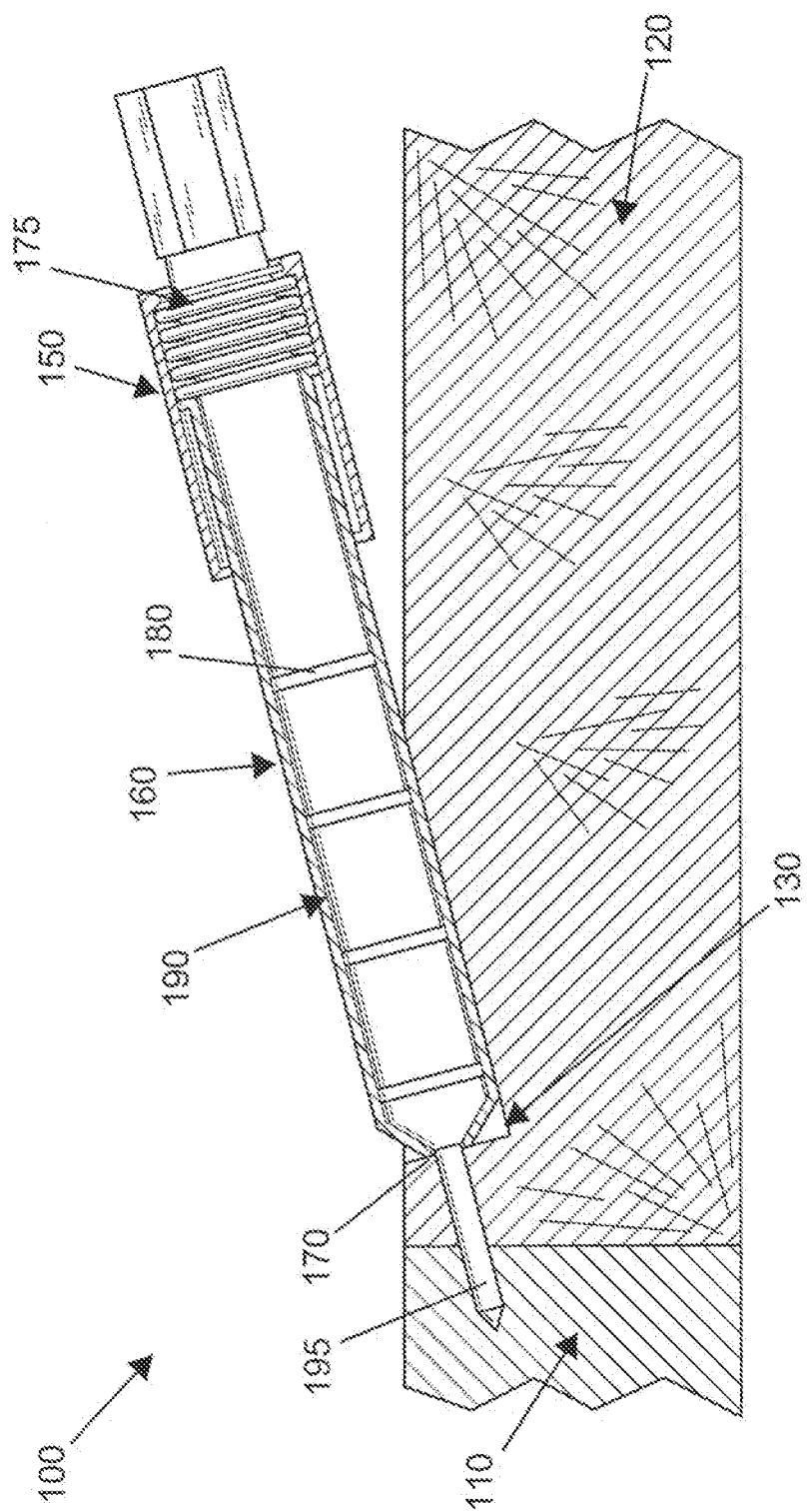
FIG. 4 shows a perspective view of the present invention in a second position while drilling a hole.
Figure 5:
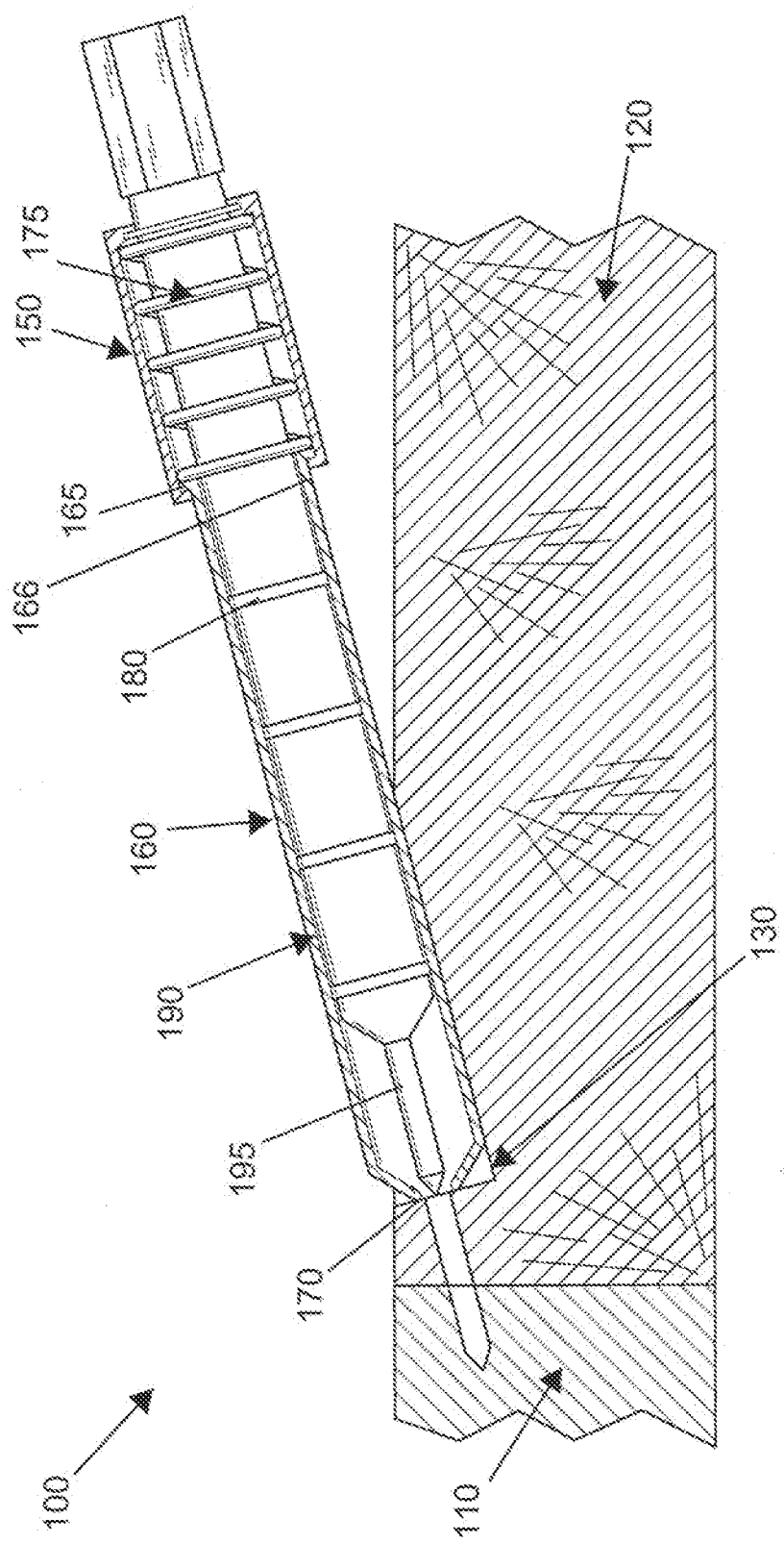
FIG. 5 shows a perspective view of the present invention in a first position after drilling a hole.

Following is a list of elements corresponding to a particular element referred to herein:
100 Drilling system
110 First wood block
111 First woodblock mating surface
120 Second wood block
121 Second wood block mating surface
122 Second wood block drilling surface
130 Pocket
131 Cylindrical side wall
132 Cylindrical diameter
133 Planar front wall
140 Drilling unit
150 Outer sleeve
151 Outer sleeve first end
152 Outer sleeve second end
155 Inside retaining lip
156 Inside periphery
160 Inner sleeve
161 Inner sleeve first end
162 Inner sleeve second end
163 Inner sleeve first end outermost tip
164 Inner sleeve outside diameter
165 Outwardly flaring lip
166 Outside periphery
170 Aperture
171 Aperture diameter
175 Coiled spring
176 Inner sidewall
180 Bushing
190 Shaft
191 Shaft first end
192 Shaft second end
195 Drill bit
196 Drill bit diameter
200 Hexagonal drive shaft Referring now to FIGS. 1-5, the present invention features a drilling system (100) for joining pieces of wood using a pocket hole joint method. In some embodiments, the system (100) composes a first wood block (110) having a planar first wood block mating surface (111). In some embodiments, the system (100) features a second wood block (120) having a planar second wood block mating surface (121) and a second wood block drilling surface (122). In some embodiments, a pocket (130) having cylindrical side wall (131) and a planar front wall (133) is angularly located on the second wood block drilling surface (122). In some embodiments, the cylindrical side wall (131) comprises a cylindrical diameter (132). In some embodiments, the second wood block mating surface (121) lies on an angle perpendicular to the second wood block drilling surface (122). In some embodiments, there is a plurality of pockets (130) located in the second wood block drilling surface (122).

In some embodiments, the system (100) comprises a drilling unit (140) having a cylindrical outer sleeve (150) featuring an outer sleeve first end (151) with a first inside retaining lip (155) located around an inside periphery (156) thereon and an outer sleeve second end (152) with a second inside retaining lip (155) located around the inside periphery (156) thereon. In some embodiments, the drilling unit (140) features a cylindrical inner sleeve (160) having a tapering inner sleeve first end (161) and an inner sleeve second end (162) with an outwardly flaring lip (165) located around an outside periphery (166) thereon. In some embodiments, an aperture (170) having an aperture diameter (171) is located on an inner sleeve first end outermost tip (163). In some embodiments, an inner sleeve outside diameter (164) comprises a size designed to snugly and slidably insert into the cylindrical diameter (132) of the pocket (130).

In some embodiments, the inner sleeve (160) is at least partially located slidably inside the outer sleeve (150). In some embodiments, the inner sleeve second end (162) is located in the outer sleeve (150) and engages a coiled spring (175) located in the outer sleeve (150). In some embodiments, the coiled spring (175) engages the outer sleeve second end (152) to bias the inner sleeve (160) to extend from the outer sleeve (150) via the outer sleeve first end (151).

In some embodiments, the inner sleeve (160) comprises a plurality of bushings (180) located on an inner sidewall (176) therein. In some embodiments, there are two bushings (180). In some embodiments, there are three bushings (180). In some embodiments, there are four or more bushings (180).

In some embodiments, the drilling unit (140) features a cylindrical shaft (190) rotatably located in the bushings (180) of the inner sleeve (160). In some embodiments, the shaft (190) comprises a shaft first end (191) and a shaft second end (192). In some embodiments, the shaft (190) is rotatably attached to the outer sleeve second end (152) at the shaft second end (192).

In some embodiments, the drilling unit (140) features a drill bit (195) located on the shaft first end (191). In some embodiments, the drill bit (195) is positioned just posterior to the aperture (170) inside the inner sleeve (160) when in a first position. In some embodiments, the drill bit (195) is positioned through the aperture (170) outside the inner sleeve (160) when in a second position. In some embodiments, the drill bit (195) comprises a drill bit diameter (196) slidably smaller than the aperture diameter (171).

In some embodiments, the drilling unit (140) features a hexagonal drive shaft (200) located on the shaft second end (192). In some embodiments, the hexagonal drive shaft (200) is for inserting into a drill for operating the drilling unit (140).

In some embodiments, the inner sleeve (160) is placed in the pocket (130). In some embodiments, the drill is activated to rotate the drill bit (195) via the shaft (190), via the hexagonal drive shaft (200). In some embodiments, a user applies force to the drill from the shaft second end (192) towards the shaft first end (191) for pushing the drill bit (195) through the second wood block (120) into the first wood block (110).

In some embodiments, the inner sleeve outside diameter (164) is less than 1/16" smaller than the cylindrical diameter (132). In some embodiments, the inner sleeve outside diameter (164) is less than 1/32" smaller than the cylindrical diameter (132).

As used herein, the term "about" refers to plus or minus 10% of the referenced number.

The disclosures of the following U.S. Patents are incorporated in their entirety by reference herein: U.S. Pat. No. D 264,930; U.S. Pat. No. 6,250,186; U.S. Pat. No. 5,649,793; U.S. Pat. No. 5,509,762; U.S. Pat. No. 5,129,292; and U.S. Pat. No. 2,792,726.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skied in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features hawing the corresponding reference numbers in the drawings.

What is claimed is:

1. A drilling system (100) for joining pieces of wood using a pocket hole joint method, wherein the system (100) comprises:
   (a) a first wood block (110) having a planar first wood block mating surface (111); and
   (b) a second wood block (120) having a planar second wood block mating surface (121) and a second wood block drilling surface (122), wherein the first wood block mating surface (111) is disposed parallel to the second wood block mating surface (121) and the second wood block mating surface (121) lies on an angle perpendicular to the second wood block drilling surface (122), wherein a pocket (130) having cylindrical side wall (131) and a planar front wall (133) is angularly disposed on the second wood block drilling surface (122), wherein the cylindrical side wall (131) comprises a cylindrical diameter (132); and
   (c) a drilling unit (140) having:
      (i) a cylindrical outer sleeve (150) having an outer sleeve first end (151) with a first inside retaining lip (155) disposed around an inside periphery (156) thereon and an outer sleeve second end (152) having a second inside retaining lip (155) disposed around the inside periphery (156) thereon,
      (ii) a cylindrical inner sleeve (160) having a tapering inner sleeve first end (161) and an inner sleeve second end (162) having an outwardly flaring lip (165) disposed around an outside periphery (166) thereon, wherein an aperture (170) having an aperture diameter (171) is disposed on an inner sleeve first end outermost tip (163), wherein an inner sleeve outside diameter (164) comprises a size designed to enable the inner sleeve (160) to snugly and slidably insert into the cylindrical diameter (132) of the pocket (130),
      wherein the inner sleeve outside diameter (164) is less than 1/16" smaller than the cylindrical diameter (132), wherein the inner sleeve outside diameter (164) is less than 1/32" smaller than the cylindrical diameter (132);
      wherein the inner sleeve (160) is at least partially disposed slidably inside the outer sleeve (150), wherein the inner sleeve second end (162) is disposed in the outer sleeve (150) and engages a coiled spring (175) disposed in the outer sleeve (150), wherein the coiled spring (175) engages the outer sleeve second end (152) to bias the inner sleeve (160) to extend from the outer sleeve (150) via the outer sleeve first end (151),
      wherein the inner sleeve (160) comprises a plurality of bushings (180) disposed on an inner sidewall (176) therein,
      (iii) a cylindrical shaft (190) rotatably disposed in the bushings (180) of the inner sleeve (160), wherein the shaft (190) comprises a shaft first end (191) and a shaft second end (192), wherein the shaft (190) is rotatably disposed on the outer sleeve second end (152) at the shaft second end (192),
      (iv) a drill bit (195) disposed on the shaft first end (191), wherein the drill bit (195) is positioned just posterior to the aperture (170) inside the inner sleeve (160)

when in a first position, wherein the drill bit (195) is positioned through the aperture (170) outside the inner sleeve (160) when in a second position, wherein the drill bit (195) comprises a drill bit diameter (196) slidably smaller than the aperture diameter (171), and (v) a hexagonal drive shaft (200) disposed on the shaft second end (192), wherein the hexagonal drive shaft (200) is for inserting into a drill for operating the drilling unit (140);

wherein the inner sleeve (160) is disposed in the pocket (130), wherein the drill is activated to rotate the drill bit (195) via the shaft (190), via the hexagonal drive shaft (200), wherein a user applies force to the drill from the shaft second end (192) towards the shaft first end (191) for pushing the drill bit (195) through the second wood block (120) into the first wood block (110).

2. A drilling system (100) for joining pieces of wood using a pocket hole joint method, wherein the system (100) consisting of:

(a) a first wood block (110) having a planar first wood block mating surface (111); and (b) a second wood block (120) having a planar second wood block mating surface (121) and a second wood block drilling surface (122), wherein the first wood block mating surface (111) is disposed parallel to the second wood block mating surface (121) and the second wood block mating surface (121) lies on an angle perpendicular to the second wood block drilling surface (122), wherein a pocket (130) having cylindrical side wall (131) and a planar front wall (133) is angularly disposed on the second wood block drilling surface (122), wherein the cylindrical side wall (131) comprises a cylindrical diameter (132); and (c) a drilling unit (140) having:

(i) a cylindrical outer sleeve (150) having an outer sleeve first end (151) with a first inside retaining lip (155) disposed around an inside periphery (156) thereon and an outer sleeve second end (152) having a second inside retaining lip (155) disposed around the inside periphery (156) thereon, (ii) a cylindrical inner sleeve (160) having a tapering inner sleeve first end (161) and an inner sleeve second end (162) having an outwardly flaring lip (165) disposed around an outside periphery (166) thereon, wherein an aperture (170) having an aperture diameter (171) is disposed on an inner sleeve first end outermost tip (163), wherein an inner sleeve outside diameter (164) comprises a size designed to enable the inner sleeve (160) to snugly and slidably insert into the cylindrical diameter (132) of the pocket (130), wherein the inner sleeve outside diameter (164) is less than 1/16" smaller than the cylindrical diameter (132), wherein the inner sleeve outside diameter (164) is less than 1/32" smaller than the cylindrical diameter (132);

wherein the inner sleeve (160) is at least partially disposed slidably inside the outer sleeve (150), wherein the inner sleeve second end (162) is disposed in the outer sleeve (150) and engages a coiled spring (175) disposed in the outer sleeve (150), wherein the coiled spring (175) engages the outer sleeve second end (152) to bias the inner sleeve (160) to extend from the outer sleeve (150) via the outer sleeve first end (151), wherein the inner sleeve (160) comprises a plurality of bushings (180) disposed on an inner sidewall (176) therein, (iii) a cylindrical shaft (190) rotatably disposed in the bushings (180) of the inner sleeve (160), wherein the shaft (190) comprises a shaft first end (191) and a shaft second end (192), wherein the shaft (190) is rotatably disposed on the outer sleeve second end (152) at the shaft second end (192), (iv) a drill bit (195) disposed on the shaft first end (191), wherein the drill bit (195) is positioned just posterior to the aperture (170) inside the inner sleeve (160) when in a first position, wherein the drill bit (195) is positioned through the aperture (170) outside the inner sleeve (160) when in a second position, wherein the drill bit (195) comprises a drill bit diameter (196) slidably smaller than the aperture diameter (171), and (v) a hexagonal drive shaft (200) disposed on the shaft second end (192), wherein the hexagonal drive shaft (200) is for inserting into a drill for operating the drilling unit (140);

wherein the inner sleeve (160) is disposed in the pocket (130), wherein the drill is activated to rotate the drill bit (195) via the shaft (190), via the hexagonal drive shaft (200), wherein a user applies force to the drill from the shaft second end (192) towards the shaft first end (191) for pushing the drill bit (195) through the second wood block (120) into the first wood block (110).

* * * * *